United States Patent
Li

(10) Patent No.: US 10,481,400 B2
(45) Date of Patent: Nov. 19, 2019

(54) LENS SHIELDING MECHANISM, METHOD, AND HEAD-MOUNTED DISPLAY

(71) Applicant: Qingdao GoerTek Technology Co., Ltd., Qingdao (CN)

(72) Inventor: Yusheng Li, Qingdao (CN)

(73) Assignee: Qingdao Goertek Technology Co., Ltd., Qingdao (CN)

( * ) Notice: Subject to any disclaimer, the term of this patent is extended or adjusted under 35 U.S.C. 154(b) by 33 days.

(21) Appl. No.: 15/740,659

(22) PCT Filed: May 25, 2016

(86) PCT No.: PCT/CN2016/083321
§ 371 (c)(1),
(2) Date: Dec. 28, 2017

(87) PCT Pub. No.: WO2017/016299
PCT Pub. Date: Feb. 2, 2017

(65) Prior Publication Data
US 2018/0188539 A1    Jul. 5, 2018

(30) Foreign Application Priority Data
Jul. 30, 2015    (CN) .......................... 2015 1 0458892

(51) Int. Cl.
*G02B 27/14*    (2006.01)
*G09G 5/00*    (2006.01)
(Continued)

(52) U.S. Cl.
CPC ......... *G02B 27/0172* (2013.01); *G02B 5/005* (2013.01); *G02B 27/0176* (2013.01);
(Continued)

(58) Field of Classification Search
CPC ................ G02B 27/0172; G02B 5/005; G02B 27/0176; G02B 27/0955; G02B 27/2228; G02B 2027/0132; G02B 2027/0178
(Continued)

(56) References Cited

U.S. PATENT DOCUMENTS 2,696,754 A    12/1954    Mamock
6,547,403 B2    4/2003    Inaba

FOREIGN PATENT DOCUMENTS

CN    102209124 A    10/2011
CN    103309122 A    9/2013
(Continued)

OTHER PUBLICATIONS

Supplementary European Search Report dated May 2, 2018 issued in corresponding EP application No. 16829666.3.
(Continued)

*Primary Examiner* — William Choi
(74) *Attorney, Agent, or Firm* — Fox Rothschild LLP; Carol E. Thorstad-Forsyth

(57) ABSTRACT

The present disclosure discloses a lens shielding mechanism, a lens shielding method and a head-mounted display using the lens shielding mechanism. The lens shielding mechanism is used for shielding an area exposed from a front housing (21) due to leftward and rightward movements of a lens (22). The lens shielding mechanism comprises: a group of shielding sheets (23) having a certain width. The group of shielding sheets (23) is arranged on left and right sides of the lens (22) and is fixedly connected to the lens (22). When the lens (22) moves leftwardly and rightwardly, the lens drives the group of shielding sheets (23) to move, and an area exposed from the front housing (21) due to the leftward and rightward movements of the lens (22) is shielded by the group of shielding sheets (23). The lens
(Continued)

shielding mechanism has a good shielding effect and a simple structure, and occupies a small space.

5 Claims, 5 Drawing Sheets

(51) Int. Cl.
    *G02B 27/01*     (2006.01)
    *G02B 27/09*     (2006.01)
    *G02B 5/00*     (2006.01)
    *G02B 27/22*     (2018.01)

(52) U.S. Cl.
    CPC ...... *G02B 27/0955* (2013.01); *G02B 27/2228* (2013.01); *G02B 2027/0132* (2013.01); *G02B 2027/0178* (2013.01)

(58) Field of Classification Search
    USPC ......... 359/630, 738, 808, 811, 818; 345/7–9
    See application file for complete search history.

(56) References Cited

FOREIGN PATENT DOCUMENTS

| | | | |
|---|---|---|---|
| CN | 103309123 A | * | 9/2013 |
| CN | 103309123 A | | 9/2013 |
| CN | 203376542 U | | 1/2014 |
| CN | 203376543 U | | 1/2014 |
| CN | 203825300 U | | 9/2014 |
| CN | 203981982 U | | 12/2014 |
| CN | 105044911 A | | 11/2015 |
| CN | 204989627 U | | 1/2016 |
| EP | 1045596 A2 | | 10/2000 |
| JP | 2000295637 A | | 10/2000 |
| JP | 4399789 B2 | | 1/2010 |

OTHER PUBLICATIONS

Office Communication dated Jun. 15, 2018 issued in corresponding EP application No. 16829666.3.
Written Opinion of International Searching Authority dated Aug. 18, 2016 for PCT/CN2016/083321 and English translation.

* cited by examiner

LENS SHIELDING MECHANISM, METHOD, AND HEAD-MOUNTED DISPLAY

RELATED APPLICATION DATA

The present application is the U.S. National Phase of International Patent Application No. PCT/CN2016/083321, filed on May 25, 2016 and entitled "LENS SHIELDING MECHANISM, METHOD, AND HEAD-MOUNTED DISPLAY," which claims priority to Chinese Patent Application No. CN 201510458892.4, filed on Jul. 30, 2015 and entitled "LENS SHIELDING MECHANISM, METHOD, AND HEAD-MOUNTED DISPLAY," the contents of which are incorporated herein by reference in their entireties.

TECHNICAL FIELD

The present disclosure relates to the technical field of shielding mechanism, and particularly relates to a lens shielding mechanism, a lens shielding method and a head-mounted display.

BACKGROUND ART

Generally speaking, the pupil distance of every user is not the same, so in wearable displays and other display products (for example, a head-mounted display) the location of lens must be adjusted to match the pupil distances of different users, in order to facilitate the use of the users and satisfy the personal requirement of the users. FIG. 1 is the schematic illustration of a head-mounted display in the prior art. In FIG. 1, 11 is a front housing of the head-mounted display, and 12 is a lens. When the lens 12 moves leftwardly and rightwardly to adjust the pupil distance, the location of the lens 12 changes and the inside structure of the product is exposed; that is, there is an exposed area. Accordingly, the debris may enter inside of the product through the exposed area and affect the performance and service life of the product, and also affect the appearance of the product.

SUMMARY OF THE DISCLOSURE

The present disclosure provides a lens shielding mechanism and a lens shielding method to solve the problem that the debris enters inside of the product and affects the performance, service life and appearance of the product when the lens moves and an area is exposed from the front housing. In addition, the present disclosure further provides a head-mounted display comprising the lens shielding mechanism.

To achieve the above object, the technical solutions of the present disclosure are as follows.

According to one aspect of the present disclosure, there is provided a lens shielding mechanism for shielding an area exposed from a front housing due to leftward and rightward movements of a lens, wherein the shielding mechanism comprises a group of shielding sheets having a certain width;

the group of shielding sheets is arranged on left and right sides of the lens and is fixedly connected to the lens; and when the lens moves leftwardly and rightwardly, the lens drives the group of shielding sheets to move, and an area exposed from the front housing due to the leftward and rightward movements of the lens is shielded by the group of shielding sheets.

Optionally, the group of shielding sheets comprises a first shielding sheet;

the first shielding sheet is arranged on the left and right sides of the lens and is fixedly connected to the lens; and when the lens moves leftwardly and rightwardly, the lens drives the first shielding sheet to move, and the area exposed from the front housing due to the leftward and rightward movements of the lens is shielded by the first shielding sheet.

Optionally, the group of shielding sheets comprises a first shielding sheet and a second shielding sheet connected together;

the first shielding sheet is arranged on the left and right sides of the lens and is fixedly connected to the lens;

the second shielding sheet is arranged on the left and right sides of the first shielding sheet, and the second shielding sheet is connected to the front housing and is moveable leftwardly and rightwardly with respect to the front housing; and when the lens moves leftwardly and rightwardly to a certain distance, the first shielding sheet can drive the second shielding sheet to expand alternately, and the area exposed from the front housing due to the leftward and rightward movements of the lens is shielded by both the first shielding sheet and the second shielding sheet.

Optionally, the upper portion and the lower portion of the lens are provided respectively with two protruding columns passing through the first shielding sheet, to achieve fixed connection of the first shielding sheet and the lens;

the upper portion and the lower portion of the second shielding sheet are provided respectively with two limiting holes matching with the protruding columns, and the protruding column clips in the limiting hole and is slidable leftwardly and rightwardly in the limiting hole;

a clip hook is provided on the front housing, a slot matching with the clip hook is provided at a middle position between the upper portion and the lower portion of the second shielding sheet, and the second shielding sheet is connected to the front housing via matching of the slot and the clip hook;

when the lens moves leftwardly and rightwardly to a distance smaller than the length of the limiting hole, the protruding column on the lens slides in the limiting hole, the second shielding sheet does not move, and the area exposed from the front housing due to the leftward and rightward movements of the lens is shielded by the first shielding sheet; and when the lens moves leftwardly and rightwardly and drives the protruding column to move to the extreme position of the limiting hole, the protruding column drives the second shielding sheet to continue moving leftwardly and rightwardly with respect to the clip hook on the front housing within the length range of the slot, and the area exposed from the front housing due to the leftward and rightward movements of the lens is shielded by alternately expanding the first shielding sheet and the second shielding sheet.

Optionally, the first shielding sheet and the lens are formed integrally.

Optionally, the material of the shielding sheets is metal or plastic.

Additionally, the present disclosure further provides a head-mounted display, a lens of which is provided with the lens shielding mechanism of the present disclosure.

Correspondingly to the lens shielding mechanism, the present disclosure further provides a lens shielding method for shielding an area exposed due to movements of a lens, wherein the shielding method comprises:

by using a group of shielding sheets having a certain width, arranging the group of shielding sheets on the left and right sides of the lens, and fixedly connecting the group of shielding sheets to the lens so that when the lens moves leftwardly and rightwardly, the lens drives the group of shielding sheets to move, and the area exposed from the front housing due to the leftward and rightward movements of the lens is shielded by the group of shielding sheets.

Optionally, the group of shielding sheets comprises a first shielding sheet; and the method further comprises arranging the first shielding sheet on the left and right sides of the lens, and fixedly connecting the first shielding sheet and the lens so that when the lens moves leftwardly and rightwardly, the lens drives the first shielding sheet to move, and the area exposed from the front housing due to the leftward and rightward movements of the lens is shielded by the first shielding sheet.

Optionally, the group of shielding sheets comprises a first shielding sheet and a second shielding sheet connected together;

the method further comprises arranging the first shielding sheet on the left and right sides of the lens, and fixedly connecting the first shielding sheet and the lens; and arranging the second shielding sheet on the left and right sides of the first shielding sheet, and connecting the second shielding sheet and the front housing so that the second shielding sheet is moveable leftwardly and rightwardly with respect to the front housing; and wherein when the lens moves leftwardly and rightwardly to a certain distance, the first shielding sheet can drive the second shielding sheet to expand alternately, and the area exposed from the front housing due to the leftward and rightward movements of the lens is shielded by both the first shielding sheet and the second shielding sheet.

The present disclosure can achieve the following advantageous effects. In the lens shielding mechanism and the lens shielding method provided in the technical solutions of the present disclosure, a group of shielding sheets having a certain width is used and the group of shielding sheets is arranged on the left and right sides of the lens. Accordingly, when the lens moves leftwardly and rightwardly to adjust the pupil distance, the group of shielding sheets can be used to shield the area exposed due to the leftward and rightward movements of the lens, so the debris is prevented from entering the housing and the properties, duration and appearance of the product will not be affected. Moreover, the shielding sheet used in the present disclosure occupies a small volume, and is cheaper compared with large and expensive shielding mechanisms. In addition, the present disclosure further provides a head-mounted display using the lens shielding mechanism, which also has the merits that the structure is simple, the shield effect is good, and the cost is low since it comprises the lens shielding mechanism.

DETAILED DESCRIPTION

The core concept of the present disclosure is as follows. Regarding the problem of the prior art that when the lens moves leftwardly and rightwardly to adjust the pupil distance, an area will be exposed from the front housing and the debris may enter the housing and affect the service life, performance and appearance of the product, in the present disclosure, a group of shielding sheets is used in the shielding mechanism to shield the area exposed when the lens moves.

Figure 1:
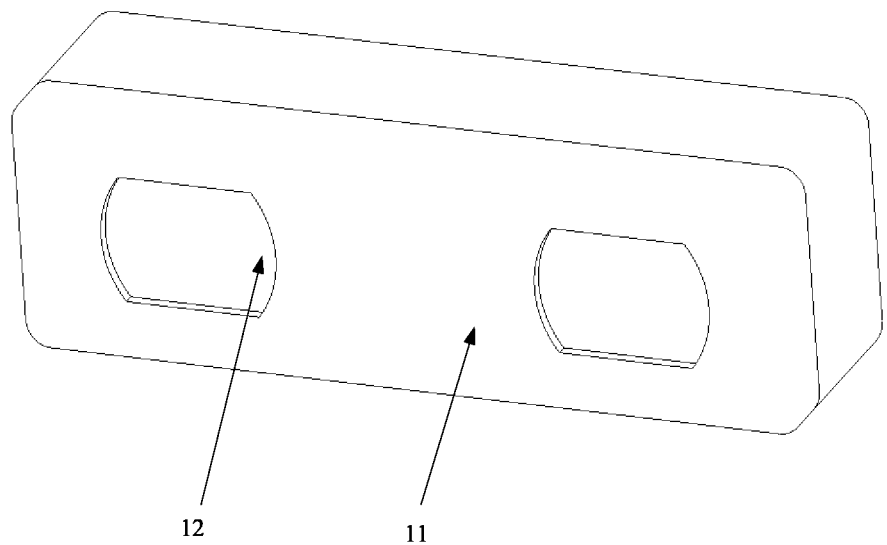
FIG. 1 is the schematic illustration of a head-mounted display in the prior art.
Figure 2:
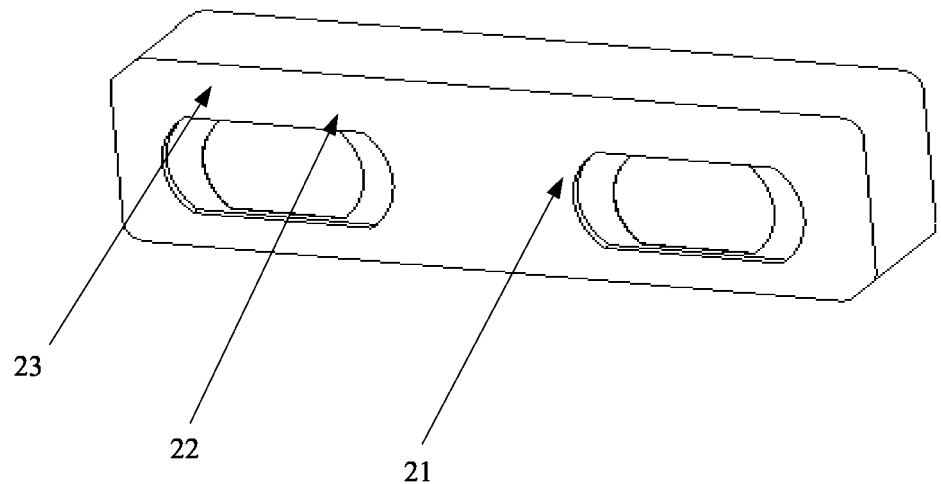
FIG. 2 is the schematic illustration of the overall structure of a lens shielding mechanism of an embodiment of the present disclosure.

FIG. 2 is the schematic illustration of the overall structure of a lens shielding mechanism of an embodiment of the present disclosure. Referring to FIG. 2, the lens shielding mechanism of the embodiment of the present disclosure is used for shielding an area exposed from a front housing 21 due to leftward and rightward movements of a lens 22, and it comprises a group of shielding sheets 23 having a certain width; the group of shielding sheets 23 is arranged on the left and right sides of the lens 22 and is fixedly connected to the lens 22; and when the lens 22 moves leftwardly and rightwardly, the lens 22 drives the group of shielding sheets 23 to move, and the area exposed from the front housing 21 due to the leftward and rightward movements of the lens 22 is shielded by the group of shielding sheets 23.

Accordingly, if the lens shielding mechanism shown in FIG. 2 is used, when the lens 22 moves leftwardly and rightwardly, the area exposed due to the leftward and rightward movements of the lens 22 is shielded by the group of shielding sheets 23, and the problem that the debris may enter the housing and affect the performance, service life and appearance of the product is solved. Moreover, the shielding mechanism of the embodiments of the present disclosure has the merits that the volume occupied is small, the area shielded is large and the structure is simple and easy to achieve.

First Embodiment

In an embodiment of the present disclosure, the group of shielding sheets comprises a first shielding sheet; the first shielding sheet is arranged on the left and right sides of the lens and is fixedly connected to the lens so that when the lens moves leftwardly and rightwardly the lens drives the first shielding sheet to move, and the area exposed from the front housing due to the leftward and rightward movements of the lens is shielded by the first shielding sheet. That is, in the present embodiment, the group of shielding sheets may comprise two first shielding sheets, and the two first shielding sheets are connected to two lenses (the left lens and the right lens) respectively. Accordingly, both the left lens and the right lens can move to adjust the pupil distance, and at the same time the problem that the performance, service life and appearance of the product are affected due to an exposed area not being shielded will not appear. However, in such a case, the first shielding sheet has a relatively large size, and the housing size of small and delicate products such as head-mounted displays will be larger correspondingly, so such a first shielding sheet has the shortcoming that the miniaturization of head-mounted displays is impeded.

In addition, in the present embodiment, the group of shielding sheets may comprise only one first shielding sheet; that is, the first shielding sheet is arranged on the left and right sides of one of the two lens and is fixedly connected. In such a case, in order to better shield the area exposed when the lens moves leftwardly and rightwardly, probably the user can move leftwardly and rightwardly only the lens which is provided with the shielding sheet to adjust the pupil distance. However, in such an arrangement, one first shielding sheet can be saved and the cost is lower.

Second Embodiment

Figure 3:
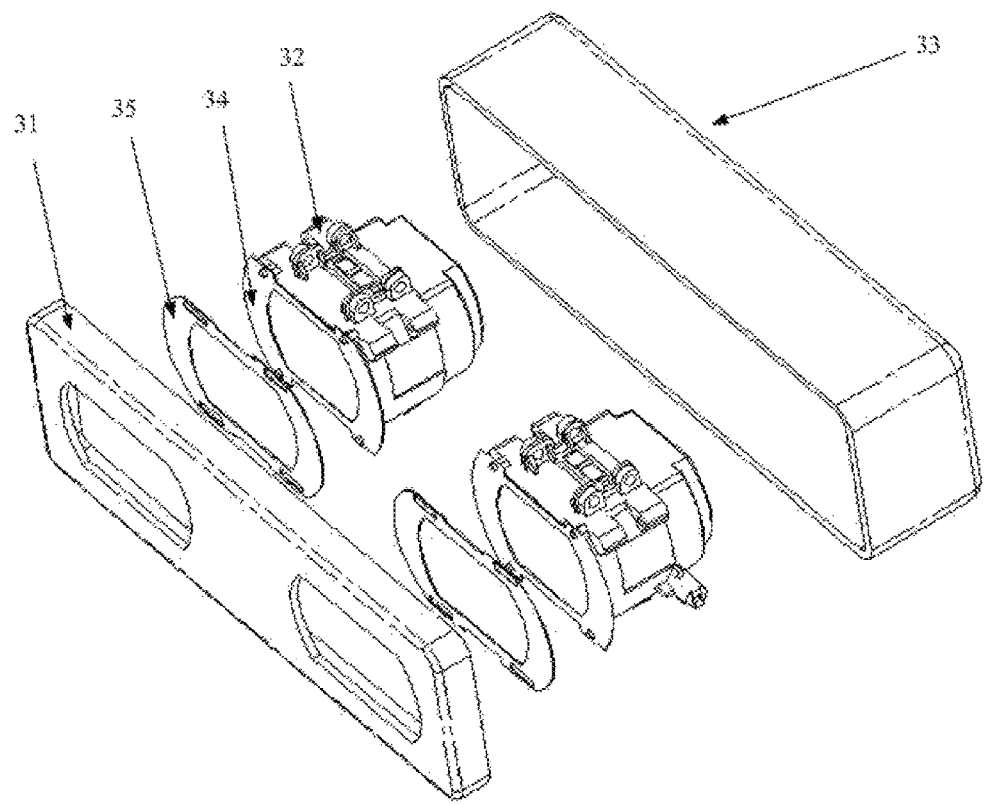
FIG. 3 is the schematic illustration of the exploded structure of a lens shielding mechanism of an embodiment of the present disclosure.

FIG. 3 is the schematic illustration of the exploded structure of a lens shielding mechanism of an embodiment of the present disclosure. Referring to FIG. 3, in the present embodiment, the group of shielding sheets comprises a first shielding sheet 34 and a second shielding sheet 35 connected together;

the first shielding sheet 34 is arranged on the left and right sides of the lens 32 and is fixedly connected to the lens 32;

the second shielding sheet 35 is arranged on the left and right sides of the first shielding sheet 34, and the second shielding sheet 35 is fixedly connected to the front housing 31 and is moveable leftwardly and rightwardly with respect to the front housing 31; and when the lens 32 moves leftwardly and rightwardly to a certain distance, the first shielding sheet 34 can drive the second shielding sheet 35 to expand alternately, and the area exposed from the front housing 31 due to the leftward and rightward movements of the lens 32 is shielded by both the first shielding sheet 34 and the second shielding sheet 35.

In the present embodiment, the group of shielding sheets may comprise two first shielding sheets and two second shielding sheets. The two first shielding sheets are connected to two lenses (the left lens and the right lens) respectively, and the two second shielding sheets are connected to the two first shielding sheets respectively. Accordingly, both the left lens and the right lens can move to adjust the pupil distance, so the balance of movement can be ensured, and at the same time the problem that the performance, service life and appearance of the product are affected due to an exposed area not being shielded will not appear. In addition, the same as that in the first embodiment, the group of shielding sheets may also only comprises one first shielding sheet and one second shielding sheet; that is, the one first shielding sheet is arranged on the left and right sides of one of the two lens and is fixedly connected, and the one second shielding sheet is connected to the one first shielding sheet. In such a case, in order to better shield the area exposed when the lens moves leftwardly and rightwardly, probably the user can move leftwardly and rightwardly only the lens which is provided with the shielding sheet to adjust the pupil distance. However, the cost is lower in such an arrangement.

Figure 4:
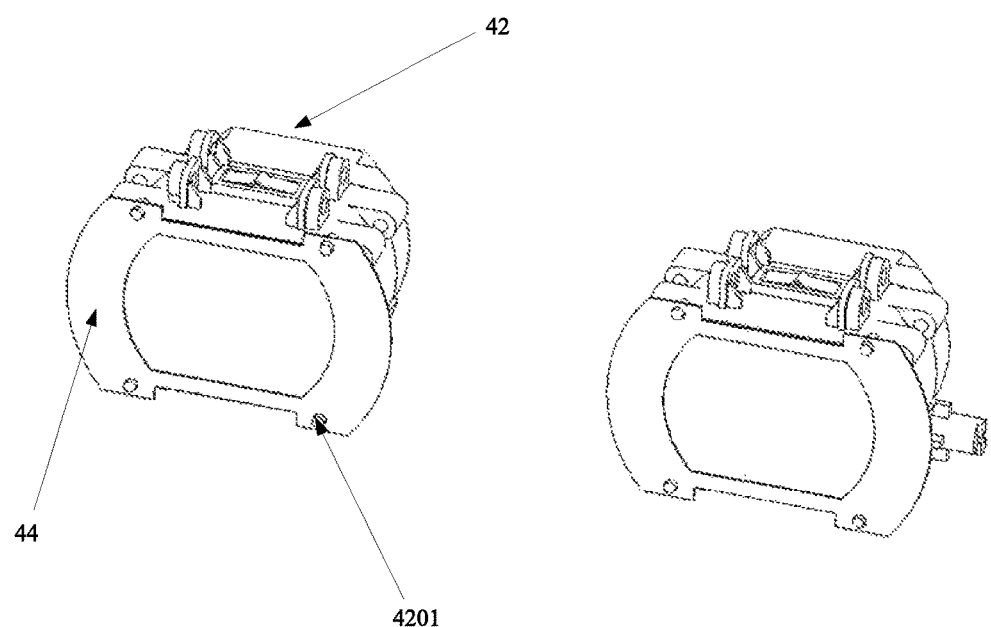
FIG. 4 is the schematic illustration of the connection structure of a first shielding sheet and a lens in the lens shielding mechanism shown in FIG. 3.
Figure 5:
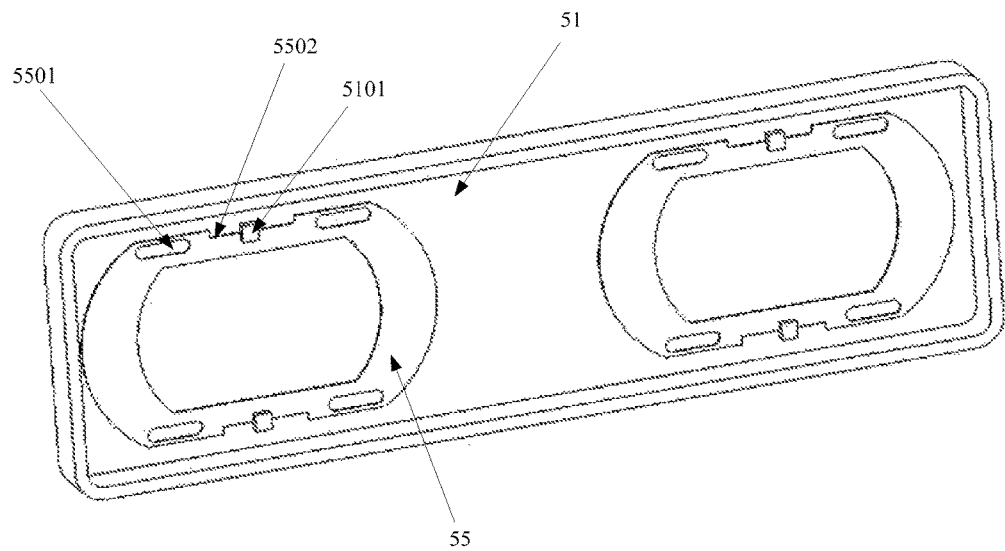
FIG. 5 is the schematic illustration of the connection structure of a second shielding sheet and a front housing in the lens shielding mechanism shown in FIG. 3.

FIG. 4 is the schematic illustration of the connection structure of the first shielding sheet and the lens in the lens shielding mechanism shown in FIG. 3, and FIG. 5 is the schematic illustration of the connection structure of the second shielding sheet and the front housing in the lens shielding mechanism shown in FIG. 3. The lens shielding mechanism of the present embodiment will be further illustrated below by referring to FIG. 4 and FIG. 5.

Referring to FIG. 4 and FIG. 5, in the present embodiment, the upper portion and the lower portion of the lens 42 are provided respectively with two protruding columns 4201 passing through the first shielding sheet 44, to achieve the fixed connection of the first shielding sheet 44 and the lens 42.

The upper portion and the lower portion of the second shielding sheet 55 are provided respectively with two limiting holes 5501 matching with the protruding columns 4201, and the protruding column 4201 clips in the limiting hole 5501 and is slidable leftwardly and rightwardly in the limiting hole 5501;

A clip hook 5101 is provided at the front housing 51, a slot 5502 matching with the clip hook 5101 is provided at a middle position between the upper portion and the lower portion of the second shielding sheet 55, and the second shielding sheet 55 is connected to the front housing 51 via the matching of the slot 5502 and the clip hook 5101.

When the lens 42 moves leftwardly and rightwardly to a distance smaller than the length of the limiting hole 5501, the protruding column 4201 on the lens 42 slides in the limiting hole 5501, the second shielding sheet 55 does not move, and the area exposed from the front housing 51 due to the leftward and rightward movements of the lens 42 is shielded by the first shielding sheet 44.

When the lens 42 moves leftwardly and rightwardly and drives the protruding column 4201 to move to the extreme position of the limiting hole 5501, the protruding column 4201 drives the second shielding sheet 55 to continue moving leftwardly and rightwardly with respect to the clip hook 5101 on the front housing 51 within the length range of the slot 5502, and the area exposed from the front housing 51 due to the leftward and rightward movements of the lens 42 is shielded by alternately expanding of the first shielding sheet 44 and the second shielding sheet 55.

Specially, as display products such as head-mounted displays usually have two lenses 42, that is, the left lens and the right lens, in the present embodiment, in order to maintain the balance in movements, each lens 42 is provided with four protruding columns 4201. Two protruding columns 4201 of them are arranged at the upper portion of the lens 42, and the other two protruding columns 4201 are arranged at the lower portion of the lens 42. Each protruding column 4201 passes through the first shielding sheet 44, and clips in the limiting hole 5501 corresponding to the second shielding sheet 55. Accordingly, when the lens 42 moves rightwardly (here, taking the lens moving rightwardly as an example, and understandably, it is the same when the lens moves leftwardly), the protruding column 4201 will slide rightwardly in the limiting hole 5501 along with the movement of the lens 42, and therefore the area exposed from the front housing 51 due to the rightward movement of the lens 42 is shielded by the first shielding sheet 44. During the movement of the lens 42, when the protruding column 4201 moves rightwardly to the right boundary of the limiting hole 5501, if the lens 42 continues moving rightwardly, due to the protruding column 4201 driving the limiting hole 5501, the slot 5502 of the second shielding sheet 55 will move rightwardly with respect to the clip hook 5101. At this point, the first shielding sheet 44 and the second shielding sheet 55 expand alternately to shield the area exposed from the front housing 51 when the lens 42 moves rightwardly. It should be noted that, in such a case, the distance that the second shielding sheet 55 moves rightwardly is limited by the length of the slot 5502; that is, the distance that the lens 42 continues moving rightwardly depends on the length of the slot 5502.

Figure 6:
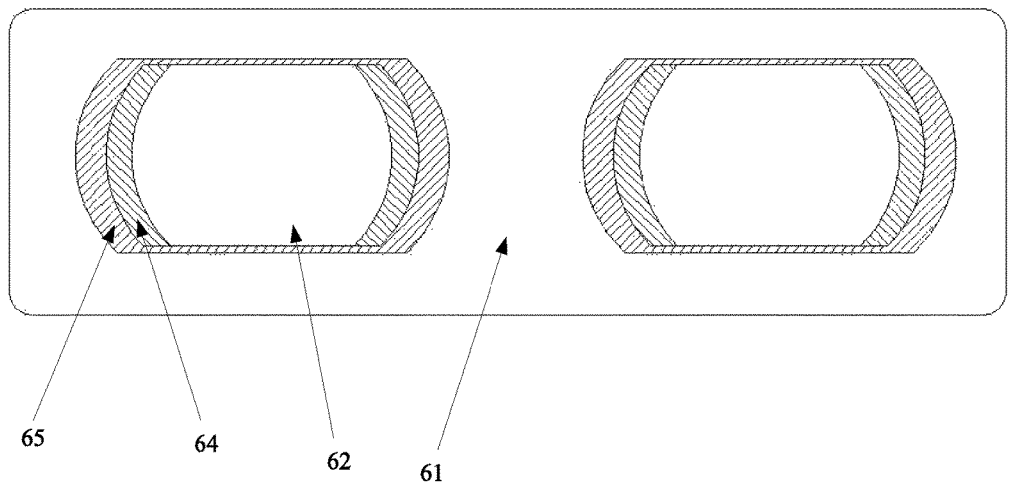
FIG. 6 is the schematic illustration of the front view of a front housing in the lens shielding mechanism shown in FIG. 3.

FIG. 6 is the schematic illustration of the front view of the front housing in the lens shielding mechanism shown in FIG. 3. Referring to FIG. 6, it can be seen from the schematic illustration of the front view of the front housing that, the lens is at the middle position; that is, the lens is in the initial state that it has not moved leftwardly and rightwardly to adjust the pupil distance. The front housing 61, the lens 62, the first shielding sheet 64 arranged on the left and right sides of the lens 62, and the second shielding sheet 65 arranged on the left and right sides of the first shielding sheet 64 can be seen from FIG. 6. The front housing mentioned in the embodiments of the present disclosure is the housing facing the eyes of the user in display products having lenses such as head-mounted displays, that is, the housing closest to the eyes of the user.

In addition, in practical use, the lengths of the limiting hole and the slot should be designed reasonably to better match the distance that the lens moves leftwardly and rightwardly. If it can be ensured that the exposed area is shielded during adjusting the pupil distance, the size of the shielding sheets (that is, the width of the shielding sheets) should be as short as possible, since the size of the shielding sheets will influence the size of the housing of products such as head-mounted displays. As there is a trend that head-mounted displays become increasingly smaller and lighter, preferably, in the embodiments of the present disclosure, the design of alternately expanding the first shielding sheet and the second shielding sheet in the second embodiment is employed to shorten the size of the shielding sheets. The relation between the number and the size of the shielding sheets will be illustrated in detail below by referring to FIG. 7.

Figure 7:
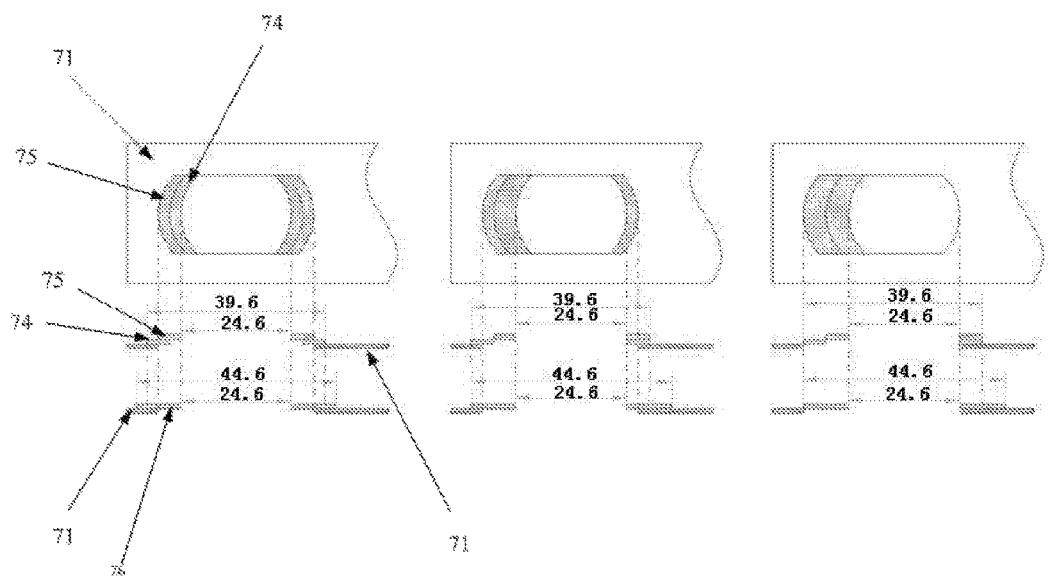
FIG. 7 is the schematic illustration of the shielding results by using one shielding sheet and by using two shielding sheets alternately expanded in the lens shielding mechanism provided by an embodiment of the present disclosure.

FIG. 7 is the schematic illustration of the shielding results by using one shielding sheet and by using two shielding sheets alternately expanded in the lens shielding mechanism provided by an embodiment of the present disclosure. Referring to FIG. 7, FIG. 7 shows three small figures, wherein the small figure on the left schematically represents the initial state that the lens has not moved to adjust the pupil distance, the small figure in the middle schematically represents the state when the lens moves rightwardly by a certain distance to a first movement position, and the small figure on the right schematically represents the state when the lens continues moving rightwardly by a certain distance to a second movement position. Referring to FIG. 7, the content of the first line under the three small figures in FIG. 7 shows the size required for moving the same distance (in the present embodiment, the lens can move rightwardly or leftwardly by 5 mm) and the location relation of the front housing 71, the first shielding sheet 74 and the second shielding sheet 75 when the first shielding sheet and the second shielding sheet are used to expand alternately. The content of the second line under the three small figures in FIG. 7 shows the size required for moving the same distance and the location relation when only one shielding sheet 76 is used. Referring to FIG. 7, assuming that in the above two cases, the size of the lens (the length of the lens) is the same, that is, 24.6 mm, and when the lens moves rightwardly (here, taking the lens moving rightwardly as an example, and understandably, it is the same when the lens moves leftwardly) to adjust the pupil distance and moves to a first movement position (the lens moves rightwardly by 2.5 mm) and further moves to a second movement position (the lens moves rightwardly by 5 mm), if the first shielding sheet 74 and the second shielding sheet 75 cooperate, a size of 39.6 mm is enough to satisfy the need of shielding the exposed area. On the other hand, in order to shield the area of the same size, if the lens only uses the shielding sheets 76, a size of 44.6 mm is required to satisfy the need.

The first movement position here may refer to the above-mentioned state that the protruding column 4201 freely slides in the limiting hole, and the second movement position may refer to the above-mentioned state that the protruding column 4201 moves to the boundary of the limiting hole 5501 and further drives the slot 5502 to move with respect to the clip hook 5101.

Apparently, compared with the technical solution that only the shielding sheets 76 is used, if the technical solution that the first shielding sheet 74 and the second shielding sheet 75 are used to expand alternately is adopted, the size can be reduced by 5 mm. Accordingly, correspondingly, the size of head-mounted displays may also be reduced to adapt to the compacting trend of head-mounted displays, and enhance the product competitiveness. In addition, in the present embodiment, the length 24.6 mm of the lens and the distance 5 mm that the lens moves are only schematic illustration, and in other embodiments of the present disclosure, the cooperating size of the shielding sheets should be properly designed according to the size of the lens and the distance that the lens moves leftwardly and rightwardly, and is not limited to the 39.6 mm of the present embodiment.

It should be noted that, in the embodiments of the present disclosure, several figures are provided, which describe the structure and the effects of the shielding mechanism of the embodiments of the present disclosure from different directions. In the several figures, the illustration is made with respect to two directions of the same head-mounted display, and therefore, the reference object should be identified when understanding the left/right moving directions in the figures. For example, although in the embodiments of the present disclosure, "the shielding sheet moves rightwardly" shown in FIG. 5 and "the shielding sheet moves rightwardly" shown in FIG. 6 and FIG. 7 all use the words "moves rightwardly", they are not the same direction, but two opposite directions. That is, FIG. 5 is a view seen from the back surface of the shielding sheets to the direction going far away from the eyes of the user, and FIG. 6 and FIG. 7 are views seen from the front housing to the direction coming closer to the eyes of the user.

Figure 8A:
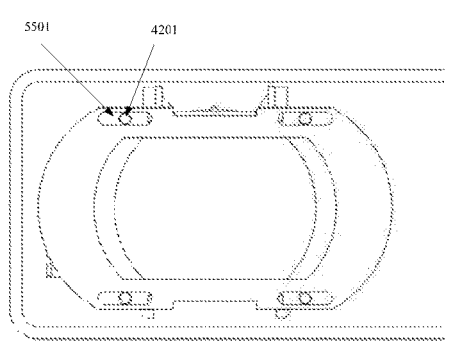
FIG. 8a is the schematic illustration of the back view of the lens shielding mechanism provided by an embodiment of the present disclosure in the initial state without lens movement.
Figure 8B:
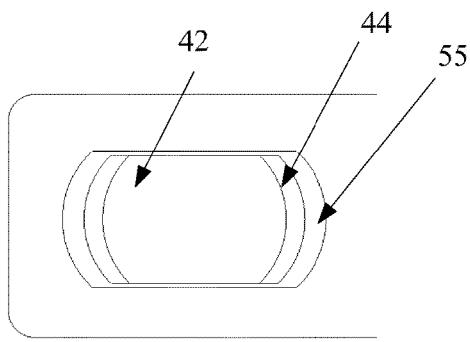
FIG. 8b is the schematic illustration of the front view of the lens shielding mechanism shown in FIG. 8a in the initial state without lens movement.
Figure 9A:
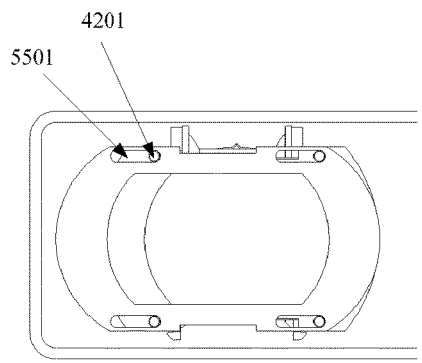
FIG. 9a is the schematic illustration of the back view of the lens shielding mechanism provided by an embodiment of the present disclosure when the lens moves rightwardly to the first movement position.
Figure 9B:
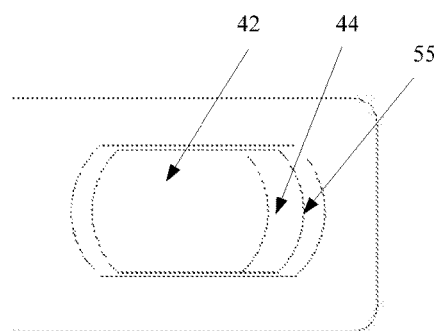
FIG. 9b is the schematic illustration of the front view when the lens shown in FIG. 9a moves rightwardly to the first movement position.
Figure 10A:
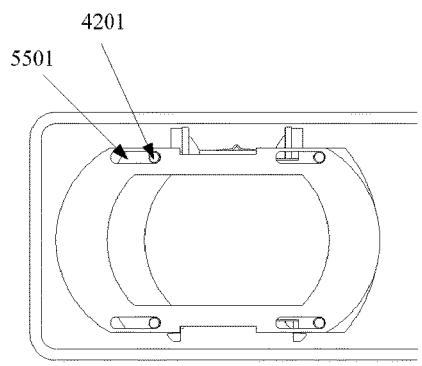
FIG. 10a is the schematic illustration of the back view of the lens shielding mechanism provided by an embodiment of the present disclosure when the lens moves rightwardly to the second movement position.
Figure 10B:
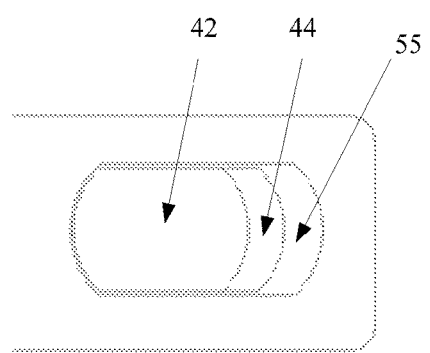
FIG. 10b is the schematic illustration of the front view when the lens shown in FIG. 10a moves rightwardly to the second movement position.

FIG. 8*a* is the schematic illustration of the back view of the lens shielding mechanism provided by an embodiment of the present disclosure in the initial state without lens movement. FIG. 8b is the schematic illustration of the front view of the lens shielding mechanism shown in FIG. 8a in the initial state without lens movement. FIG. 9a is the schematic illustration of the back view of the lens shielding mechanism provided by an embodiment of the present disclosure when the lens moves rightwardly to the first movement position. FIG. 9b is the schematic illustration of the front view when the lens shown in FIG. 9a moves rightwardly to the first movement position. FIG. 10a is the schematic illustration of the back view of the lens shielding mechanism provided by an embodiment of the present disclosure when the lens moves rightwardly to the second movement position. FIG. 10b is the schematic illustration of the front view when the lens shown in FIG. 10a moves rightwardly to the second movement position.

Referring to FIG. 8a-FIG. 10b, the moving process of the lens shielding mechanism of the embodiments of the present disclosure will be illustrated below by referring to the movement position of the lens. FIG. 8a is the schematic illustration of the back view in the initial state without lens movement. It can be seen from FIG. 8a that, in the initial state, the lens has not moved leftwardly and rightwardly, and the protruding column 4201 clips at the middle position of the limiting hole 5501. The location relation of the lens 42, the first shielding sheet 44 and the second shielding sheet 55 can be seem from the schematic illustration of the front view of the front housing provided in FIG. 8b. Then, the lens begins to move rightwardly to adjust the pupil distance. Referring to FIG. 9a, the lens and the first shielding sheet move to a certain distance, and the lens protruding column 4201 freely moves in the limiting hole 5501 of the second shielding sheet. The lens drives the protruding column 4201 to move to the right extreme position of the limiting hole 5501. At this point, the second shielding sheet does not move, and the area exposed from the front housing due to the movements of the lens is shielded by the first shielding sheet. Referring to FIG. 9b, the lens 42 moves rightwardly, and the first shielding sheet 44 follows the lens 42 to move rightwardly (that looks like pulling out the side wall of the first shielding sheet) to shield the area exposed due to the rightward movements of the lens 42. FIG. 10a is the schematic illustration of the back view when the lens moves rightwardly to the second movement position. On the basis of FIG. 9a, when the lens arrives at the first movement position it continues moving rightwardly, and the protruding column 4201 drives the second shielding sheet to begin moving right. At this point the lens 42, the first shielding sheet 44 and the second shielding sheet 55 move rightwardly together, and the area exposed due to the rightward movements of the lens is shielded by the first shielding sheet 44 and the second shielding sheet 55 expanding alternately. Specially, referring to FIG. 10b, when the lens 42 moves rightwardly, the side exposed by the first shielding sheet 44 and the second shielding sheet 55 is larger than the side exposed in FIG. 9b, and that is because the lens moves rightwardly farther than it does in FIG. 9b, and thus the expanding alternately of the first shielding sheet and the second shielding sheet is required to shield the area exposed due to the rightward movements of the lens.

The operation process of the lens shielding mechanism of the embodiments of the present disclosure is described above. It can be seen from the above process that, the shielding mechanism of the embodiments of the present disclosure has the merits that the volume occupied is small, the area shielded satisfies the design requirements and the structure is simple and easy to achieve.

In the present embodiment, the first shielding sheet and the lens are formed integrally. Such an integrally formed structure is good for mass production and also increases the firmness of the product.

In the present embodiment, a material of the shielding sheets is metal or plastic. Using the shielding sheets of metal or plastic can reduce the cost of the lens shielding mechanism of the embodiments of the present disclosure and enhance the product competitiveness.

It should be noted that, in the second embodiment of the present disclosure, the case that the group of shielding sheets comprises the first shielding sheet and the second shielding sheet is schematically illustrated as an example. In other embodiments of the present disclosure, the group of shielding sheets may comprise more shielding sheets, and the more shielding sheets expand alternately to shield the area exposed from the front housing due to the leftward and rightward movements of the lens. The principle is the same as that of the second embodiment and is not repeated here.

In addition, the present disclosure further provides a head-mounted display, a lens of which is provided with the lens shielding mechanism of the present disclosure.

Further, correspondingly to the lens shielding mechanism, the present disclosure further provides a lens shielding method for shielding an area exposed due to movements of a lens, wherein the shielding method comprises:

by using a group of shielding sheets having a certain width, arranging the group of shielding sheets on left and right sides of the lens, and fixedly connecting the group of shielding sheets to the lens so that when the lens moves leftwardly and rightwardly, the lens drives the group of shielding sheets to move, and the area exposed from the front housing due to the leftward and rightward movements of the lens is shielded by the group of shielding sheets.

In an embodiment of the present disclosure, the group of shielding sheets comprises a first shielding sheet; and the method further comprises arranging the first shielding sheet on the left and right sides of the lens, and fixedly connecting the first shielding sheet and the lens so that when the lens moves leftwardly and rightwardly, the lens drives the first shielding sheet to move, and the area exposed from the front housing due to the leftward and rightward movements of the lens is shielded by the first shielding sheet.

In another embodiment of the present disclosure, the group of shielding sheets comprises: a first shielding sheet and a second shielding sheet connected together;

the method further comprises arranging the first shielding sheet on the left and right sides of the lens, and fixedly connecting the first shielding sheet and the lens; and arranging the second shielding sheet on the left and right sides of the first shielding sheet, and connecting the second shielding sheet and the front housing so that the second shielding sheet is moveable leftwardly and rightwardly with respect to the front housing; and wherein when the lens moves leftwardly and rightwardly to a certain distance, the first shielding sheet can drive the second shielding sheet to expand alternately, and the area exposed from the front housing due to the leftward and rightward movements of the lens is shielded by both the first shielding sheet and the second shielding sheet.

It should be noted that, the lens shielding method of the present disclosure is corresponding to the above lens shielding mechanism, so the steps of the lens shielding method of the present embodiment may refer to the special illustration of the above lens shielding mechanism, and will not be discussed in detail.

In conclusion, the lens shielding mechanism and the lens shielding method provided in the embodiments of the present disclosure have the following merits:

1. The inside structure will not be exposed when the lens moves, so the appearance will not be affected, the inside structure will not be damaged due to outside dust entering or user's finger inserting, and the problems such as that the duration and appearance of the product are affected are solved.

2. In the case that the group of shielding sheets comprises the first shielding sheet and the second shielding sheet, by using the first shielding sheet and the second shielding sheet cooperated with each other, the space occupied by the shielding mechanism can be reduced, and therefore the lens shielding mechanism has little or no influence on the size of the whole device.

3. The lens shielding mechanism of the embodiments of the present disclosure is easy to achieve and manufacture, and its cost is low.

In addition, the present disclosure further provides a head-mounted display. The head-mounted display comprises the lens shielding mechanism provided by the present disclosure, so the head-mounted display also has the above merits, and the user experience and product competitiveness of the head-mounted display are enhanced.

The above descriptions are merely preferable embodiments of the present disclosure, and are not limiting the protection scope of the present disclosure. Any modifications, equivalent substitutions or improvements that are made within the spirit and principle of the present disclosure are all included in the protection scope of the present disclosure.

What is claimed is:

1. A lens shielding mechanism for shielding an area exposed from a front housing due to leftward and rightward movements of a lens, wherein the shielding mechanism comprises a group of shielding sheets having a certain width;
   the group of shielding sheets is arranged on left and right sides of the lens and is fixedly connected to the lens;
   when the lens moves leftwardly and rightwardly, the lens drives the group of shielding sheets to move, and an area exposed from the front housing due to the leftward and rightward movements of the lens is shielded by the group of shielding sheets;
   wherein the group of shielding sheets comprises a first shielding sheet and a second shielding sheet connected together;
   wherein the first shielding sheet is arranged on the left and right sides of the lens and is fixedly connected to the lens;
   wherein the second shielding sheet is arranged on the left and right sides of the first shielding sheet, and the second shielding sheet is connected to the front housing and is moveable leftwardly and rightwardly with respect to the front housing;
   wherein the upper portion and the lower portion of the lens are provided respectively with two protruding columns passing through the first shielding sheet, to achieve fixed connection of the first shielding sheet and the lens;
   wherein the upper portion and the lower portion of the second shielding sheet are provided respectively with two limiting holes matching with the protruding columns, and the protruding column clips in the limiting hole and is slidable leftwardly and rightwardly in the limiting hole;
   wherein a clip hook is provided on the front housing, a slot matching with the clip hook is provided at a middle position between the upper portion and the lower portion of the second shielding sheet, and the second shielding sheet is connected to the front housing via matching of the slot and the clip hook;
   wherein when the lens moves leftwardly and rightwardly to a distance smaller than the length of the limiting hole, the protruding column on the lens slides in the limiting hole, the second shielding sheet does not move, and the area exposed from the front housing due to the leftward and rightward movements of the lens is shielded by the first shielding sheet; and
   wherein when the lens moves leftwardly and rightwardly and drives the protruding column to move to the extreme position of the limiting hole, the protruding column drives the second shielding sheet to continue moving leftwardly and rightwardly with respect to the clip hook on the front housing within a length range of the slot, and the area exposed from the front housing due to the leftward and rightward movements of the lens is shielded by alternately expanding the first shielding sheet and the second shielding sheet.

2. The lens shielding mechanism according to any of claim 1, wherein the material of the shielding sheets is metal or plastic.

3. A head-mounted display, wherein a lens of the head-mounted display is provided with a lens shielding mechanism for shielding an area exposed from a front housing due to leftward and rightward movements of a lens, wherein the shielding mechanism comprises a group of shielding sheets having a certain width;
   the group of shielding sheets is arranged on left and right sides of the lens and is fixedly connected to the lens;
   when the lens moves leftwardly and rightwardly, the lens drives the group of shielding sheets to move, and an area exposed from the front housing due to the leftward and rightward movements of the lens is shielded by the group of shielding sheets;
   wherein the group of shielding sheets comprises a first shielding sheet and a second shielding sheet connected together;
   wherein the first shielding sheet is arranged on the left and right sides of the lens and is fixedly connected to the lens;
   wherein the second shielding sheet is arranged on the left and right sides of the first shielding sheet, and the second shielding sheet is connected to the front housing and is moveable leftwardly and rightwardly with respect to the front housing;
   wherein the upper portion and the lower portion of the lens are provided respectively with two protruding columns passing through the first shielding sheet, to achieve fixed connection of the first shielding sheet and the lens;
   wherein the upper portion and the lower portion of the second shielding sheet are provided respectively with two limiting holes matching with the protruding columns, and the protruding column clips in the limiting hole and is slidable leftwardly and rightwardly in the limiting hole;
   wherein a clip hook is provided on the front housing, a slot matching with the clip hook is provided at a middle position between the upper portion and the lower portion of the second shielding sheet, and the second shielding sheet is connected to the front housing via matching of the slot and the clip hook;

wherein when the lens moves leftwardly and rightwardly to a distance smaller than the length of the limiting hole, the protruding column on the lens slides in the limiting hole, the second shielding sheet does not move, and the area exposed from the front housing due to the leftward and rightward movements of the lens is shielded by the first shielding sheet; and wherein when the lens moves leftwardly and rightwardly and drives the protruding column to move to the extreme position of the limiting hole, the protruding column drives the second shielding sheet to continue moving leftwardly and rightwardly with respect to the clip hook on the front housing within a length range of the slot, and the area exposed from the front housing due to the leftward and rightward movements of the lens is shielded by alternately expanding the first shielding sheet and the second shielding sheet.

4. The head-mounted display according to claim 3, wherein the material of the shielding sheets is metal or plastic.

5. A lens shielding method for shielding an area exposed due to movements of a lens, wherein the shielding method comprises:

by using a group of shielding sheets having a certain width, arranging the group of shielding sheets on the left and right sides of the lens, and fixedly connecting the group of shielding sheets to the lens so that when the lens moves leftwardly and rightwardly, the lens drives the group of shielding sheets to move, and an area exposed from the front housing due to the leftward and rightward movements of the lens is shielded by the group of shielding sheets;

wherein the group of shielding sheets comprises a first shielding sheet and a second shielding sheet connected together;

wherein the first shielding sheet is arranged on the left and right sides of the lens and is fixedly connected to the lens;

wherein the second shielding sheet is arranged on the left and right sides of the first shielding sheet, and the second shielding sheet is connected to the front housing and is moveable leftwardly and rightwardly with respect to the front housing;

wherein the upper portion and the lower portion of the lens are provided respectively with two protruding columns passing through the first shielding sheet, to achieve fixed connection of the first shielding sheet and the lens;

wherein the upper portion and the lower portion of the second shielding sheet are provided respectively with two limiting holes matching with the protruding columns, and the protruding column clips in the limiting hole and is slidable leftwardly and rightwardly in the limiting hole;

wherein a clip hook is provided on the front housing, a slot matching with the clip hook is provided at a middle position between the upper portion and the lower portion of the second shielding sheet, and the second shielding sheet is connected to the front housing via matching of the slot and the clip hook;

wherein when the lens moves leftwardly and rightwardly to a distance smaller than the length of the limiting hole, the protruding column on the lens slides in the limiting hole, the second shielding sheet does not move, and the area exposed from the front housing due to the leftward and rightward movements of the lens is shielded by the first shielding sheet; and wherein when the lens moves leftwardly and rightwardly and drives the protruding column to move to the extreme position of the limiting hole, the protruding column drives the second shielding sheet to continue moving leftwardly and rightwardly with respect to the clip hook on the front housing within a length range of the slot, and the area exposed from the front housing due to the leftward and rightward movements of the lens is shielded by alternately expanding the first shielding sheet and the second shielding sheet.

* * * * *